(12) United States Patent
Bogart (10) Patent No.: US 9,818,008 B2
(45) Date of Patent: Nov. 14, 2017

(54) RFID TAG EMBEDDED WITHIN AN ATTACHABLE IDENTIFIER FOR A MOLDED CONNECTOR AND A TRACKING SYSTEM THEREFOR

(71) Applicant: Integro LLC, New Britain, CT (US)

(72) Inventor: John Bogart, Oxford, CT (US)

(73) Assignee: INTEGRO, LLC, New Britain, CT (US)

( * ) Notice: Subject to any disclaimer, the term of this patent is extended or adjusted under 35 U.S.C. 154(b) by 0 days.

(21) Appl. No.: 15/631,401

(22) Filed: Jun. 23, 2017

(65) Prior Publication Data

US 2017/0293783 A1 Oct. 12, 2017

Related U.S. Application Data

(63) Continuation of application No. 15/149,427, filed on May 9, 2016, now Pat. No. 9,697,451, which is a continuation-in-part of application No. 14/500,127, filed on Sep. 29, 2014, now abandoned.

(60) Provisional application No. 61/883,674, filed on Sep. 27, 2013, provisional application No. 61/942,339, filed on Feb. 20, 2014.

(51) Int. Cl.
| | |
|---|---|
| *G06K 7/10* | (2006.01) |
| *G06K 19/077* | (2006.01) |
| *G06K 19/07* | (2006.01) |
| *H01R 13/66* | (2006.01) |

(52) U.S. Cl.
CPC ..... *G06K 7/10386* (2013.01); *G06K 19/0723* (2013.01); *G06K 19/07758* (2013.01); *H01R 13/6691* (2013.01)

(58) Field of Classification Search
CPC .......... G06K 7/10366; G06K 7/10009; G06K 7/10316; G06K 19/0723; G06K 7/10356; G06K 19/0717; G06K 7/0008; G06K 7/10128
USPC ....................................... 340/10.1
See application file for complete search history.

(56) References Cited

U.S. PATENT DOCUMENTS

| | | |
|---|---|---|
| 3,689,866 A | 9/1972 | Kelly |
| 5,957,564 A | 9/1999 | Bruce et al. |
| 6,367,952 B1 | 4/2002 | Gibboney, Jr. |
| 7,114,840 B2 | 10/2006 | Hamrick |
| 8,807,438 B2 * | 8/2014 | Kikuchi ........... G06K 19/07749 235/375 |

(Continued)

OTHER PUBLICATIONS

International Search Report and Written Opinion issued in corresponding PCT Application No. PCT/US2013/024625 dated Apr. 12, 2013.

*Primary Examiner* — Mark Blouin
(74) *Attorney, Agent, or Firm* — MKG, LLC (57) ABSTRACT

An electrical asset for distributing power for use with a Radio Frequency Identification ("RFID") tracking system and middleware. The electrical asset includes at least one attachable identifier defining an external surface and at least one radially extending portion or axially extending portion. An RFID transponder is molded into the attachable identifier and embedded within the radially or axially extending portion, and below the exterior surface of, the attachable identifier. The transponder is configured to transmit a first signal to a transmitting and receiving device and receive a second signal from the transmitting and receiving device.

6 Claims, 7 Drawing Sheets

(56) References Cited

U.S. PATENT DOCUMENTS

| | | | |
|---|---|---|---|
| 8,963,781 B2* | 2/2015 | Lin | H01Q 1/38 |
| | | | 343/700 MS |
| 9,064,197 B2* | 6/2015 | Tiedmann | G06K 19/02 |
| 9,122,967 B2* | 9/2015 | King | G06K 19/07728 |
| 9,697,451 B2 | 7/2017 | Bogart | |
| 2004/0109330 A1 | 6/2004 | Pare | |
| 2006/0204731 A1 | 9/2006 | Wani et al. | |
| 2006/0284839 A1 | 12/2006 | Breed et al. | |
| 2007/0153518 A1 | 7/2007 | Chen | |
| 2007/0256597 A1 | 11/2007 | Rukavina et al. | |
| 2009/0264000 A1 | 10/2009 | Ikeda et al. | |
| 2009/0308795 A1 | 12/2009 | Smith | |
| 2010/0184318 A1 | 7/2010 | Bogart et al. | |
| 2010/0282446 A1 | 11/2010 | Yamamoto et al. | |
| 2010/0301729 A1 | 12/2010 | Simon et al. | |
| 2011/0136394 A1 | 6/2011 | Mostoller et al. | |
| 2011/0158592 A1 | 6/2011 | Kerr et al. | |
| 2011/0263330 A1 | 10/2011 | Weston et al. | |
| 2012/0176037 A1 | 7/2012 | Lee | |
| 2015/0154433 A1 | 6/2015 | Stewart | |

\* cited by examiner

RFID TAG EMBEDDED WITHIN AN ATTACHABLE IDENTIFIER FOR A MOLDED CONNECTOR AND A TRACKING SYSTEM THEREFOR

CROSS-REFERENCE TO RELATED APPLICATION

This application is a Continuation Application of co-pending U.S. patent application Ser. No. 15/149,427 filed on May 9, 2016, which, in turn, is a Continuation-in-Part patent application of co-pending U.S. patent application Ser. No. 14/500,127 filed on Sep. 29, 2014, which in turn, claims the benefit of U.S. Provisional Patent Application Ser. No. 61/883,674 filed on Sep. 27, 2013, and U.S. Provisional Patent Application Ser. No. 61/942,339 filed on Feb. 20, 2014, all of which applications are incorporated herein by reference in their entirety.

TECHNICAL FIELD

The present invention is directed to a system and method for identifying, tracking and managing the life cycle of electrical assets related to power distribution and lighting. The present invention is further directed to a Radio Frequency Identification ("RFID") System for identifying such electrical assets, and tracking and managing related life cycle information such as maintenance and warranty information.

BACKGROUND

The use of RFID was introduced during World War II by the British to differentiate friend and foe aircraft. Since that time, RFID has been used in a wide variety of applications. Today's applications include but are not limited to identifying and tracking the movement of containers, protecting goods from shoplifting, reducing the counterfeiting of pharmaceuticals and medicines, and improving baggage handling and tracking books in libraries.

Generally speaking, an RFID System includes one or more tags or transponders and a reader. The reader has the capability to read multiple tags at a time which are in range of the reader. The markets defined above include applications exposed to a variety of rugged environments and thus require a permanently fixed identification or tag capable of surviving harsh environmental conditions and rough handling. In addition, each such fixed tag requires a unique data set for identifying and tracking the respective asset for managing related life cycle information such as maintenance and warranty information.

For example, airport lighting requires warranty tracking of certain electrical assets when transitioning from incandescent technology to light emitting diode ("LED") technology. Such LED airfield lighting products require a permanently fixed identification or tag capable of surviving harsh environmental conditions and rough handling for identifying and tracking the respective electrical asset for managing the related maintenance and warranty information.

Accordingly, the inventors have recognized that an RFID molded connector and tracking system of the present invention provides a solution for identifying and tracking respective electrical assets for managing related life cycle information such as maintenance and warranty information for both the original equipment manufacturer ("OEM") and the end user.

SUMMARY

In one aspect, the present invention resides in a Radio Frequency Identification ("RFID") tracking system for electrical power distribution assets, the system comprising: a plurality of electrical assets; at least one attachable identifier for tracking one or more of the plurality of electrical assets, the at least one attachable identifier defining an external surface and at least one radially extending portion or axially extending portion thereof; an RFID transponder molded into the at least one radially extending portion or axially extending portion and below the exterior surface of the at least one attachable identifier, the RFID transponder configured to transmit a first signal to a transmitting and receiving device and receive a second signal from the transmitting and receiving device; a portable adaptive reader having a processor and customizable interface enabled with an application configured for transmitting and receiving data to and from the RFID transponder; and a computing device having a server with middleware installed and running thereon and thereby receiving data from the reader, populating an exportable master database, and transferring the data in a useable format from the exportable master database to an external interface. In one embodiment, the attachable identifier is a shroud.

DETAILED DESCRIPTION

An RFID molded connector and tracking system of the present invention provides a solution for identifying and tracking respective electrical assets for managing related life cycle information such as maintenance and warranty information for both the OEM and the end user. The RFID molded connector and tracking system of the present invention is designed and configured to operate in and withstand rugged environments which contribute to excessive wear of selected and identified electrical assets. Such rugged environments include, for example: substantially high temperatures; substantially low temperatures; temperature fluctuations from a substantially high temperature to a substantially low temperature; substantially high pressures; moisture and/or humidity; dirt, dust, and debris; trampling by pedestrians and/or passing over by heavy objects such as vehicles, airplanes, construction equipment, and the like; and substantial vibration such as in connection with containers being transported by vehicles, airplanes, trains, vessels and the like.

Figure 1A:
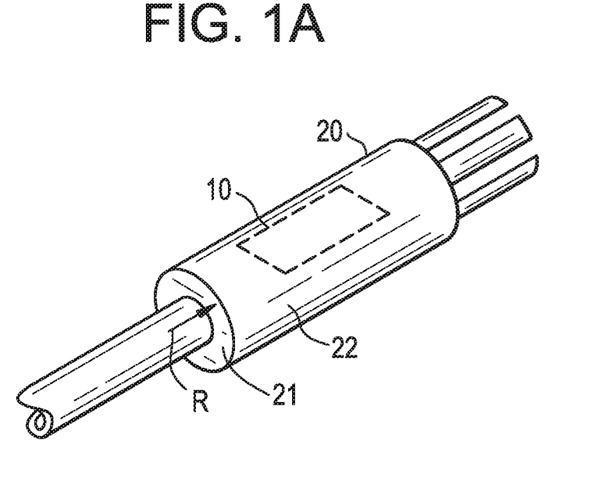
FIG. 1A provides an isometric view of one embodiment of an RFID tag embedded within an electrical asset in accordance with the present invention.
Figure 1B:
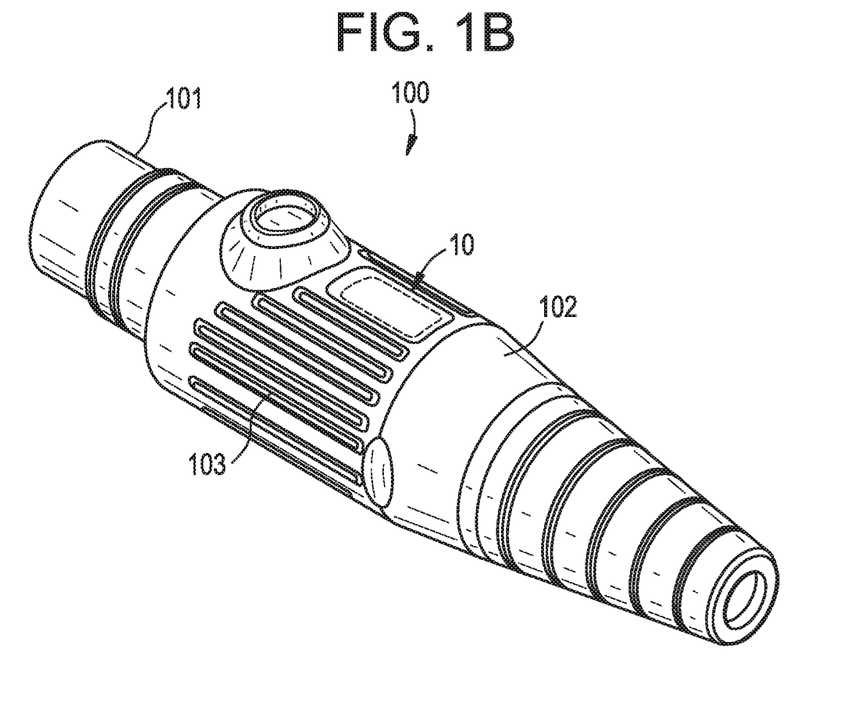
FIG. 1B provides an isometric view of another embodiment of an RFID tag embedded within an electrical asset in accordance with the present invention.
Figure 2:
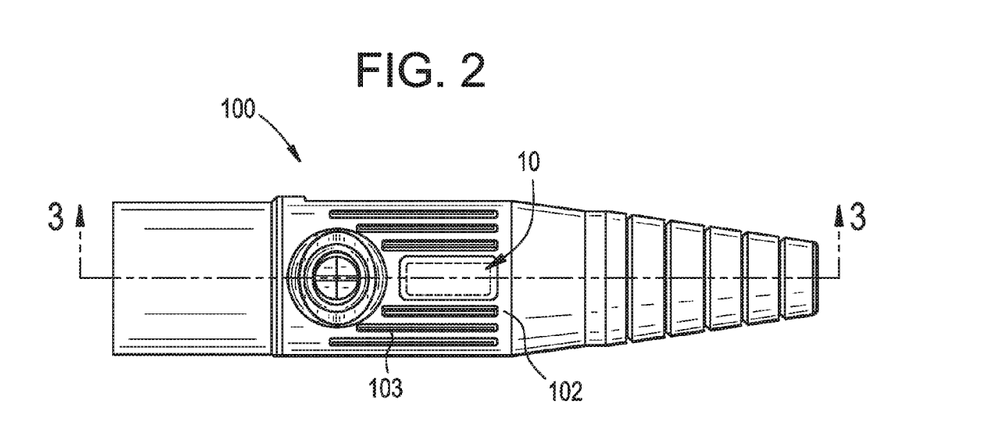
FIG. 2 is a top view of the electrical asset of FIG. 1B having an RFID tag embedded therein.

As shown in FIGS. 1A, 1B and 2, a permanently molded RFID transponder or tag 10 is used as the building block for an RFID Tracking System. The tag 10 is embedded within an electrical asset such as for example electrical components related to power distribution and lighting. In one embodiment as shown in FIG. 1A, the tag 10 is embedded within a radially extending portion 21 of an electrical connector 20 below an exterior surface 22 thereof. In one embodiment as shown in FIG. 1B, the tag 10 is embedded within an electrical connector 100 below an exterior surface 102 of a housing 101 having a radially extending portion 103. Several embodiments of a suitable connector are illustrated and discussed in U.S. patent application Ser. No. 13/770,274 (published as U.S. Patent Application Publication No. 2013/0217257), filed on Feb. 19, 2013 (now U.S. Pat. No. 9,203,191 issued on Dec. 1, 2015) which patent application is incorporated by reference here in its entirety. Additional embodiments of a suitable connector are illustrated and discussed in U.S. patent application Ser. No. 13/758,542 (published as US Patent Application Publication No. 2013/0201658), filed on Feb. 4, 2013, which patent application is incorporated by reference herein its entirety. While one tag 10 is shown and described as embedded within connector 100 beneath surface 102, the present invention is not limited in this regard as more than one tag 10 can be embedded within connector 100 beneath surface 102 without departing from the broader aspects of the present invention.

Figure 3:
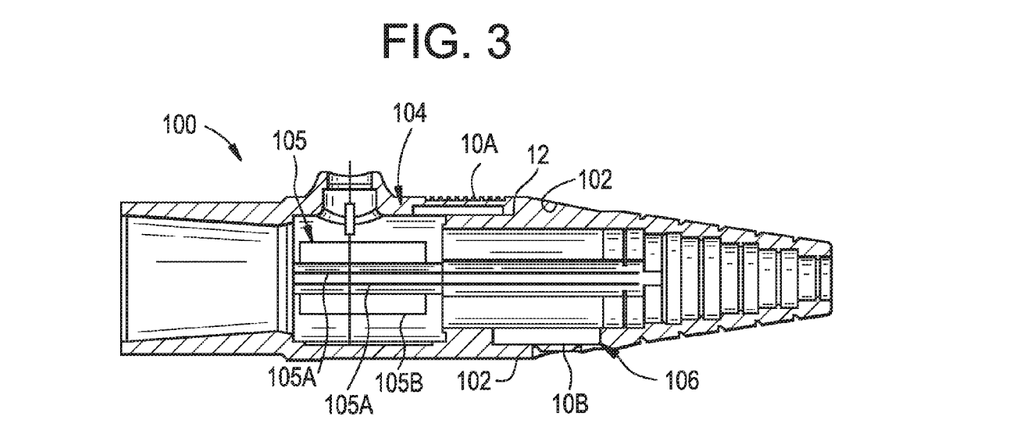
FIG. 3 is a cross-section view of the electrical asset of FIG. 1B having an RFID tag embedded therein, the cross-section taken along line A-A of FIG. 2.

As shown in FIG. 3, one embodiment of connector 100 includes a tag 10A embedded therein beneath surface 102 at a location 104 of connector 100. While tag 10A is shown and described as embedded within connector 100 beneath surface 102 at location 104, the present invention is not limited in this regard as a tag 10 can be embedded within connector 100 beneath surface 102 at any suitable location, such as for example tag 10B embedded at a location 106, without departing from the broader aspects of the present invention. In one embodiment, a metallic foil 12 is used on the back side of the RFID tag 10A to maximize the communication range. In one embodiment, the RFID tag 10 is positioned in close proximity to a conductive component 105 of the connector 100 thereby enhancing or amplifying the read strength of the RFID tag 10. For example, the RFID tag 10 is positioned in close proximity to one or more copper strands 105A or brass component 105B embedded within the connector 100; or is attached or in proximity to screws used to secure portions of the electrical asset together or to other screws within the electrical asset.

Figure 8:
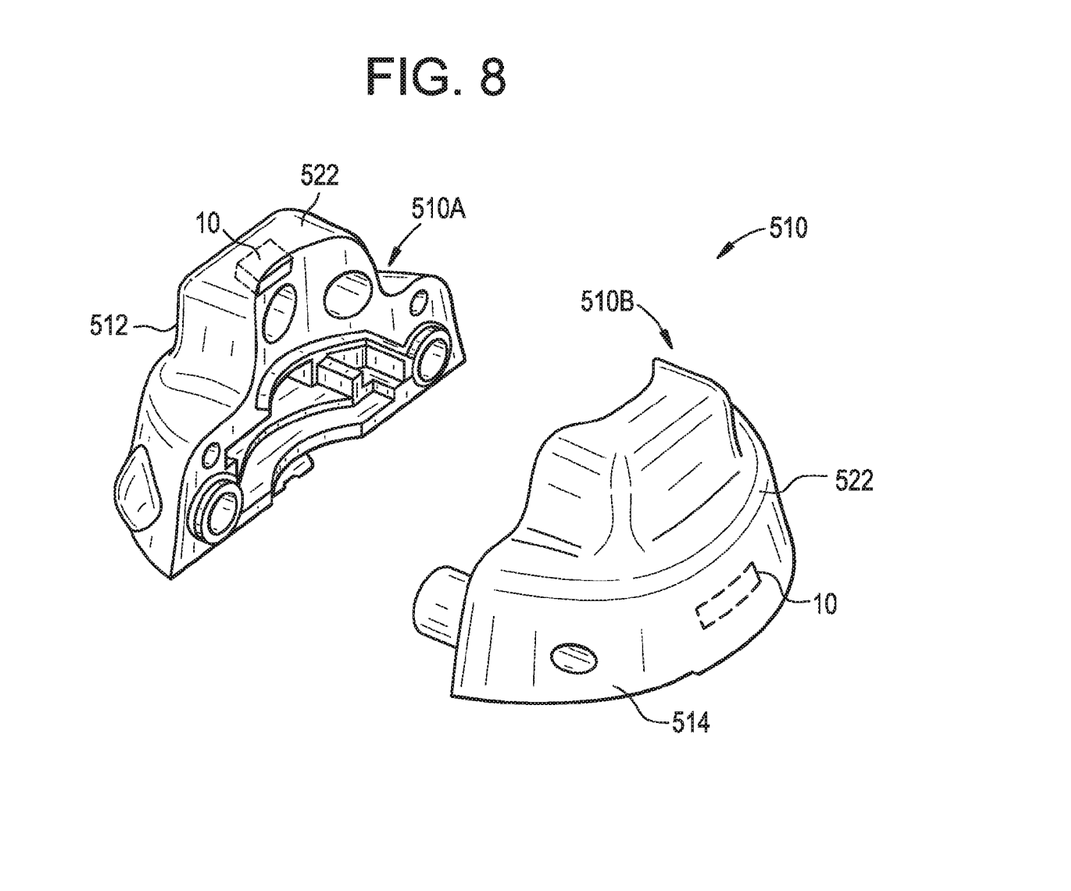
FIG. 8 provides an isometric view of another embodiment of an RFID tag embedded within an electrical asset in accordance with the present invention.
Figure 9:
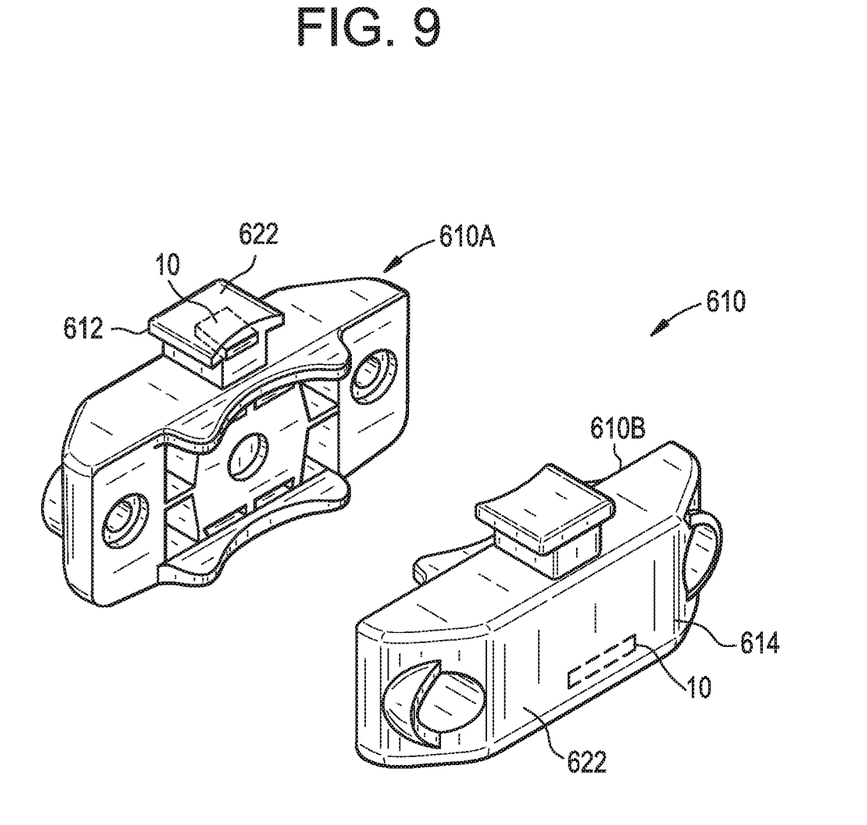
FIG. 9 provides an isometric view of another embodiment of an RFID tag embedded within an electrical asset in accordance with the present invention.

In one embodiment as shown in FIG. 8, the tag 10 is embedded within an axially extending portion 512 of a first portion 510A or a second portion 510B of an electrical connector or cable grip 510 below an exterior surface 522 thereof. Alternatively, the tag 10 is embedded within a radially extending portion 514 of the first portion 510A or the second portion 510B of the cable grip 510 below the exterior surface 522 thereof. In one embodiment as shown in FIG. 9, the tag 10 is embedded within an axially extending portion 612 of a first portion 610A or a second portion 610B of an electrical connector or cable grip 610 below an exterior surface 622 thereof. Alternatively, the tag 10 is embedded within a radially extending portion 614 of the first portion 610A or the second portion 610B of the cable grip 610 below the exterior surface 622 thereof.

While the tag 10 is shown and described as being embedded within a radially extending portion or an axially extending portion of an electrical asset, the RFID tag 10 may be more particularly embedded within the electrical asset as follows: in a cord grip; under a cord grip; in the outer shell of a connector; under the outer shell of a connector; on a front mating surface of a connector; inside a pre-mold in proximity to a metal contact; on the outside of a pre-mold; on a back side of a connector; attached to a cable jacket; attached to individual wires of a cable after the cable stripped; and a cable identification unit attached a cable.

In other embodiments, the tag 10 is embedded within the following electrical asset or component: straight blade devices; ground fault devices (e.g., straight blade, in line for extension cords, portable power distribution boxes); locking devices; power interrupting devices; pin and sleeve devices including splash proof devices; cam type devices (e.g., tee connections, tri taps); watertight devices (e.g., straight blade, twist lock, portable outlet boxes); and mining cable (e.g., a mining cord set that connects a cap lamp to a battery for its power).

Figure 6:
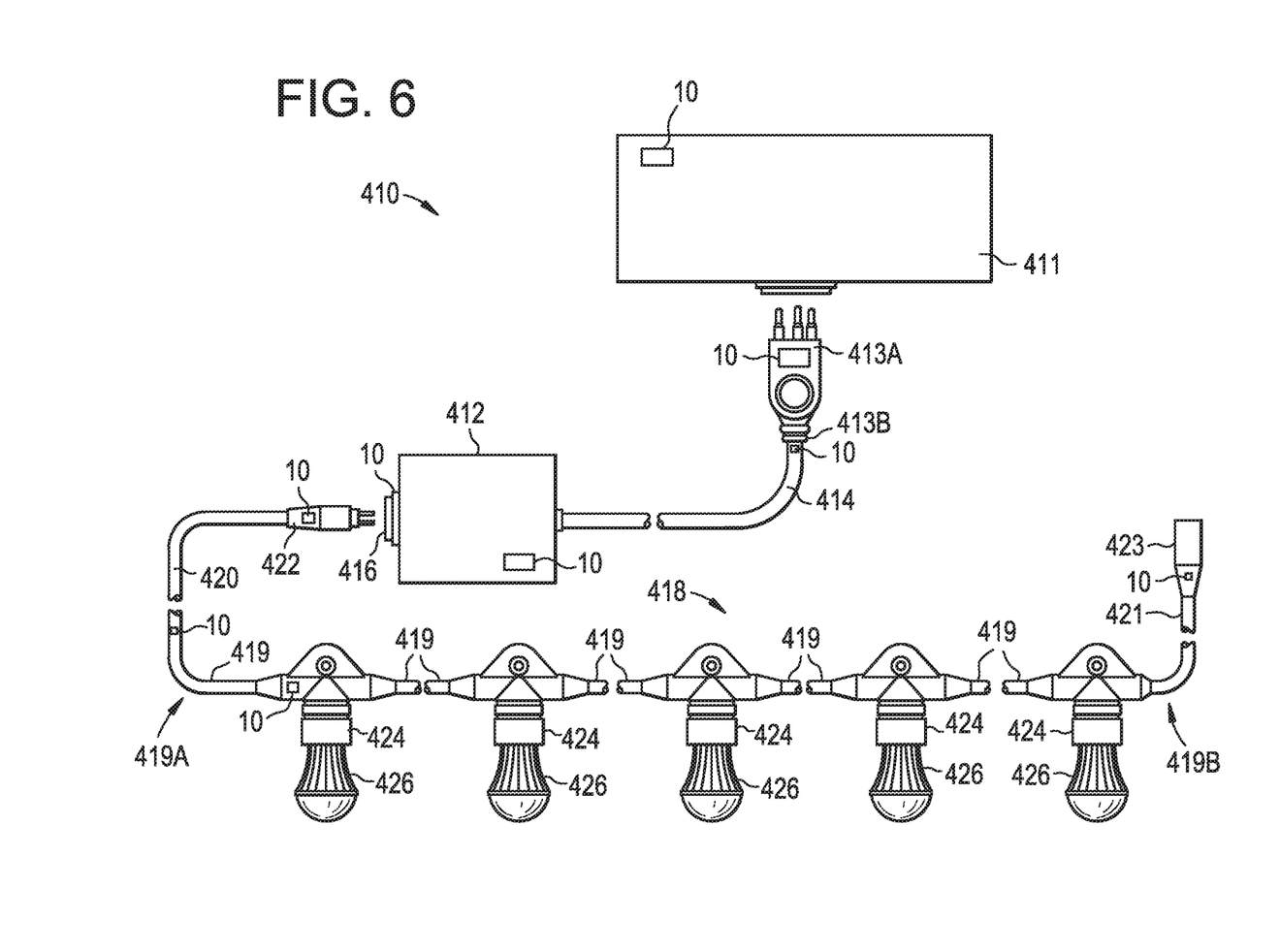
FIG. 6 is a schematic diagram of a low voltage LED lighting system having an RFID tag embedded within the electrical components thereof in accordance with the present invention.

In another embodiment as shown in FIG. 6, the tag 10 is embedded within one or more electrical assets or components of a low voltage LED lighting system 410 related to power supply and lighting. In one embodiment, the tag 10 is embedded or molded within at least one of a power supply 411, a junction or outlet box such as an AC/DC Converter 412, a power plug 413A disposed on one end of a power cord 414, a power cord grip 413B, and a power outlet 416. In one embodiment, the tag 10 is embedded or molded within a lighting streamer 418 such as for example, below the surface of at least one of a cable 419, a permanently molded first or male connector 422 on a first end 419A of the cable 419 in a cable input lead 420, a permanently molded second or female connector 423 on a second end 419B of the cable 419 in a cable output lead 422, and a molded socket 424 having an LED light bulb 426 installed therein.

In one embodiment, the tag 10 is overmolded together with the electrical asset. The tag 10 is embedded within and overmolded with an exact geometry to provide a maximum read strength while fitting inside the electrical asset with minimal or no change to the original geometry and/or profile of the electrical asset. In one embodiment, the tag 10 is molded in a two-step process to maximize read strength with superior durability and waterproof properties. The tag 10 is positioned and molded into the electrical asset in such a manner to reduce or eliminate any obstructions encumbering the readability of the tag such that it is readable from any direction or position. In one embodiment, the tag 10 is overmolded together with the electrical asset with a thermoplastic resin. In one such embodiment, the thermoplastic is one of nylon, Rynite® and Valox®. (Rynite® is a registered trademark of E. I. Du Pont De Nemours and Company Corporation of Delaware; and Valox® is a registered trademark of General Electric Company Corporation of New York.) In one embodiment, the tag 10 is overmolded together with the electrical asset with rubber. In one embodiment, the tag 10 is overmolded together with the electrical asset with a thermoplastic rubber. In one such embodiment, the thermoplastic rubber is one of Santoprene®, Sarlink® and Evoprene®. (Santoprene® is a registered trademark of Exxon Mobil Corporation of New Jersey; Sarlink® is a registered trademark of Teknor Apex Company Corporation of Delaware; and Evoprene® is a registered trademark of AlphaGary Corporation of Delaware.) In one embodiment, the tag 10 is overmolded together with the electrical asset with a urethane. In one such embodiment, the urethane or a suitable alternative is opaque such that the tag 10 remains visible beneath the surface of the overmolded electrical asset. In one embodiment, the tag 10 is overmolded together with the electrical asset with one of chloroprene, neoprene, natural rubber, siloxane, and silicone. In one embodiment, the tag 10 is overmolded together with the electrical asset with a ceramic.

Figure 7:
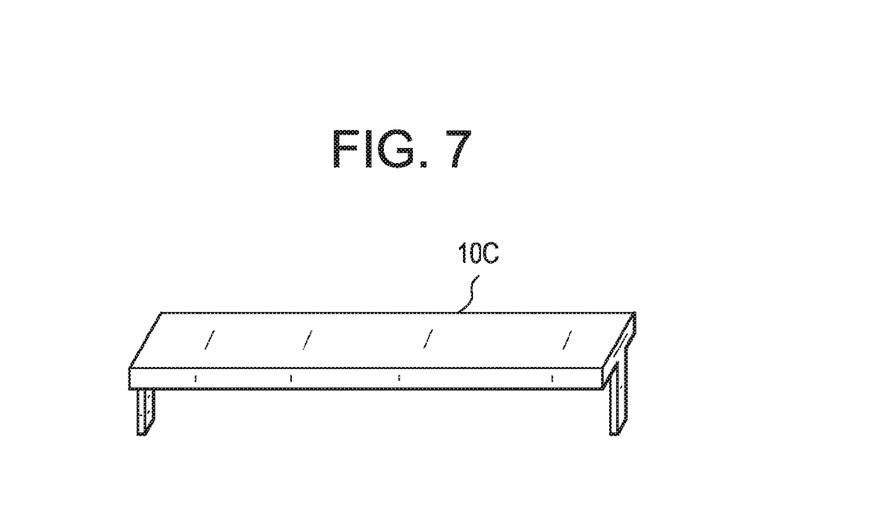
FIG. 7 provides an isometric view of a snap plate for use with the RFID tag of FIG. 1A.

In one embodiment, the tag 10 is first molded within the electrical asset and subsequently overmolded together with the electrical asset. In one embodiment, the tag 10 is first fixed within the electrical asset using an adhesive prior to a molding process. In one embodiment as shown in FIG. 7, a snap plate 10C is press fit over the tag 10 to fix the tag 10 within the electrical asset prior to a molding process. In one embodiment, the tag 10 is selectively positioned within the electrical asset prior to a molding process to advantageously maximize the use of an electrical conductor or cable attached thereto as an antenna to enhance the transmitting and receiving properties of the tag 10. During the process of molding the tag 10 within an electrical asset or overmolding the tag 10 together with the electrical asset, the tag 10 optionally is suspended in an injection mold by a plurality of pins. The pins are retracted at a precise time to fill in a precise amount of material such that the molded tag 10 is thick enough to be waterproof and durable, yet not too thick such that it can still be read clearly and with strength of signal. Thus, the tag 10 is securely molded within the electrical asset in a selectively configured location and direction in relation to the electrical asset. As used herein above and herein below, references made to the tag 10 refer collectively to the tags 10, 10A, 10B and 10C.

The tag 10 embedded or molded within an electrical asset in accordance with the present invention is configured to withstand and operate in substantially high temperatures, substantially low temperatures, and temperature fluctuations from a substantially high temperature to a substantially low temperature. In one embodiment, the tag 10 is configured to withstand and operate in temperatures in the range of about minus 30° C. (−30° C.) to about plus 85° C. (+85° C.).

The tag 10 embedded or molded within an electrical asset in accordance with the present invention is configured to withstand and operate under substantially high pressures. In one embodiment, the tag 10 is configured to withstand and operate under pressures in the range of up to about 174 PSI.

Figure 4:
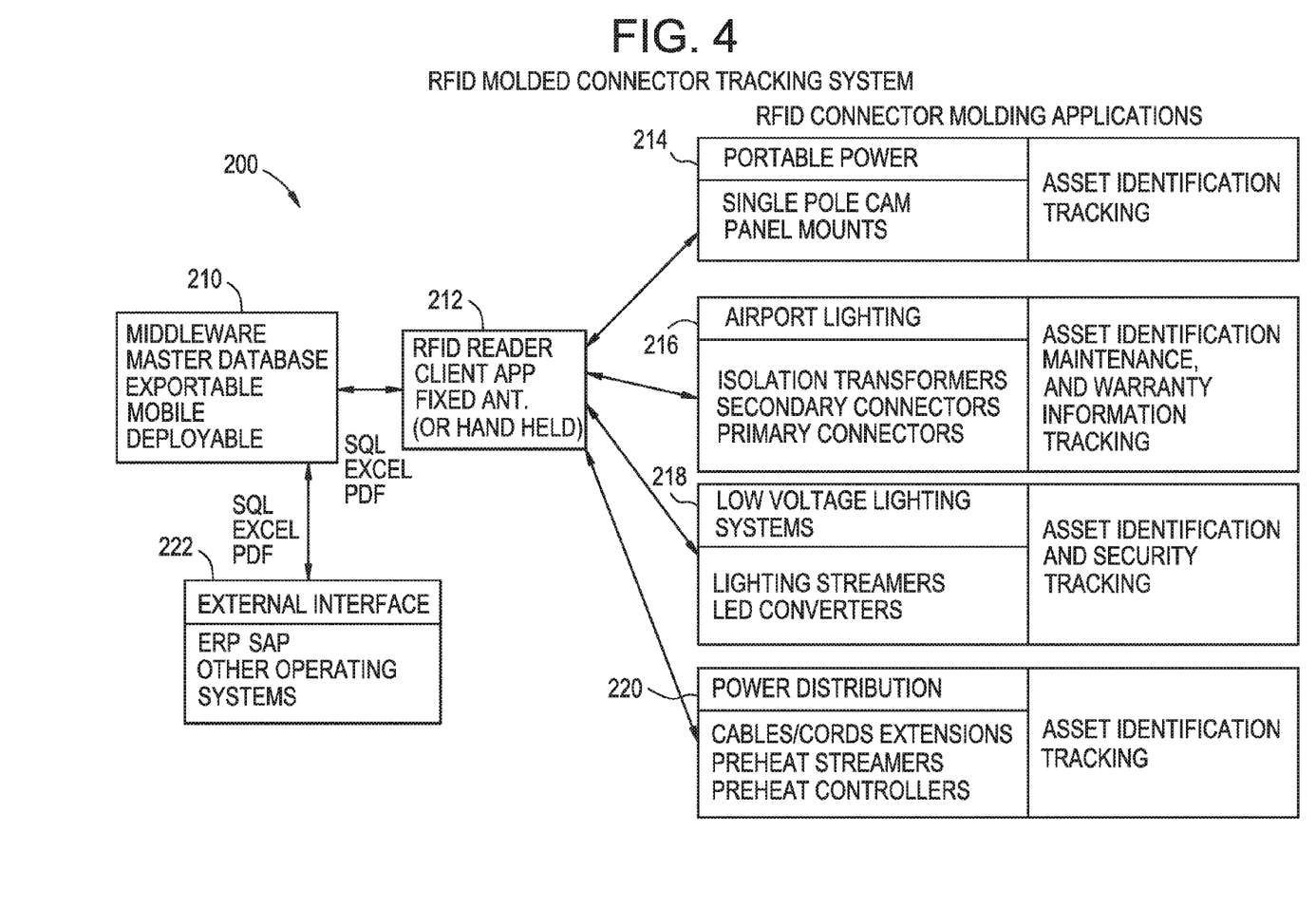
FIG. 4 is a block diagram of one embodiment of an RFID Tracking System in accordance with the present invention.

As shown in FIG. 4, one embodiment of an RFID Tracking System 200 of the present invention includes a host server or other mobile or deployable computing device server 210 as further described below. The RFID tag 10 selectively comprises a transponder that communicates with a transmitting and receiving portable adaptive device such as an RFID reader 212 having a processor and a customizable interface enabled with an application configured for an intended use such as, for example, portable power 214, airport lighting 216, low voltage lighting systems 218, and power distribution 220, as further described below. In one embodiment, the RFID reader is a hand-held reader and/or scanner. In one embodiment, a plurality of RFID tags 10 are concurrently read and/or scanned by the RFID reader 212. In such an embodiment, the RFID reader 212 includes at least one antenna or an antenna raceway system designed to concurrently read the plurality of RFID tags 10 that, for example, are bundled together and packaged on a skid of electrical assets respectively having the RFID tag embedded therein.

The RFID reader 212 collects and processes data received from the RFID tag 10 and subsequently transfers the processed data in a useable format (e.g., SQL, Excel, Portable Data Format or "pdf") to the server 210. Such data is received and processed by the server 210 having appropriate middleware installed and running thereon and thereby populating an exportable master database. Through the use of such middleware, the server 210 processes and transfers the data in a useable format (e.g., SQL, Excel, pdf) from the exportable master database to an external interface 222, such as an end-user's asset management database, wherein such transmitted data is compatible with such end-user's asset management server operating system. In one embodiment, the end-user's asset management server operating system includes enterprise resource planning ("ERP") software. In one such embodiment, the enterprise resource planning software is the SAP® ERP Software System. (SAP® is a registered trademark of SAP SE Societas Europaea of Germany.)

In the field of providing portable power, the RFID tag 10 is used to identify and track related portable power assets such as, for example, Series 16, 18, 22 & 23 Single Pole Connectors and Panel Mounts. In one embodiment, the RFID tag 10 is molded into the connectors and panel mounts for tracking of generators, power distribution boxes and cables. The RFID tag 10 identifies and tracks certain life cycle information and data of the connectors and panel mounts including but not be limited to: manufacturer; lessor; lessee; date manufactured; part number; description; serial number; location; last scanned date; and last scanned location.

In the field of airfield lighting, the RFID tag 10 is used to identify and track related airfield lighting assets such as isolation transformers, secondary and primary connectors, lighting fixtures, signs, primary circuits and other airfield lighting assets. In one embodiment, the RFID tag 10 is molded into connectors and/or attachable identifiers or shrouds for tracking of such airfield lighting assets. In one embodiment, the RFID tag 10 is molded directly into a transformer. The RFID tag 10 identifies and tracks certain life cycle information and data of the airfield lighting assets including but not be limited to: manufacturer; date manufactured; date installed; warranty end date; type (isolation transformer, fixture, and or primary circuit); part number (type); serial number; location (Global Positioning System ("GPS") coordinates, circuit/fixture identifier, pit/can identifier/circuit, etc.); maintenance date (1); maintenance description (1); maintenance date (2); maintenance description (2); maintenance date (3); maintenance description (3); maintenance date (x); maintenance description (x); etc.

In the field of low voltage lighting, the RFID tag 10 is used to identify and track related low voltage lighting assets such as power connectors (e.g., Style 1, Style 7 and U-Ground Connectors), low voltage LED converters, lighting streamers, T8 fixtures, hand lights, task lights, trouble lights, lamp holders and explosion proof/vapor proof lights. In one embodiment, the RFID tag 10 is molded into connectors and/or attachable identifiers or shrouds for tracking of such low voltage lighting assets. The RFID tag 10 identifies and tracks certain life cycle information and data of the low voltage lighting assets including but not be limited to: manufacturer; lessor; lessee; date manufactured; part number; description; serial number; location; last scanned date; and last scanned location.

In the field of power distribution, the RFID tag 10 is used to identify and track related low power distribution assets such as power connectors and outlets including all industry standard connectors (e.g., 4M50, 4F50, 4M20, 4F20, 4MJ20, 4FJ20, 3M50, 3F50, 4F20, 3F20, 3MT20, 3FT20, 15FR, Dinse style and Palmgren type), Twist Lock NEMA L type plugs, Straight NEMA Type plugs, power distribution blocks, power strips, connectors (straight blade, locking and pin/sleeve), and panel mounts (P) and yokes (multiple inputs and outputs). In one embodiment, the RFID tag 10 is molded into connectors and/or attachable identifiers or shrouds for tracking of such power distribution assets. The RFID tag 10 identifies and tracks certain life cycle information and data of the low voltage lighting assets including but not be limited to: manufacturer; date manufactured; date installed; warranty end date; type (isolation transformer, fixture, and or primary circuit); part number (type); serial number; location (GPS coordinates, circuit/fixture identifier, pit/can identifier/circuit, etc.).

In one embodiment of the RFID tag 10, data is stored therein. In one embodiment of the RFID tag 10, the RFID tag 10 is associated with data in a master database stored in, for example, an end user's server located at the end user's site. Data is updated with each scan of the RFID tag 10 wherein such updated data includes but is not limited to location, last scan date, and as further described above with respect to particular applications. Data is obtained from or read from the RFID tag 10 wherein such readable data includes but is not limited to warranty end date, and as further described above with respect to particular applications. Data is added/modified as certain triggers occur such as a maintenance repair, change in lessee, and as further described above with respect to particular applications.

Data fields are established for receiving, storing and transmitting data maintained in the RFID tag 10. Such data fields are configurable as needed are virtually unlimited when stored in a master database and referenced by the RFID tag 10.

In one embodiment, the transmission range for receiving and transmitting data maintained in the RFID tag 10 is up to about twenty (20) feet, and more particularly in the range of about fifteen (15) to about twenty (20) feet, for passive tags with proximity technology to be able to differentiate between multiple tags in the same location.

Figure 5:
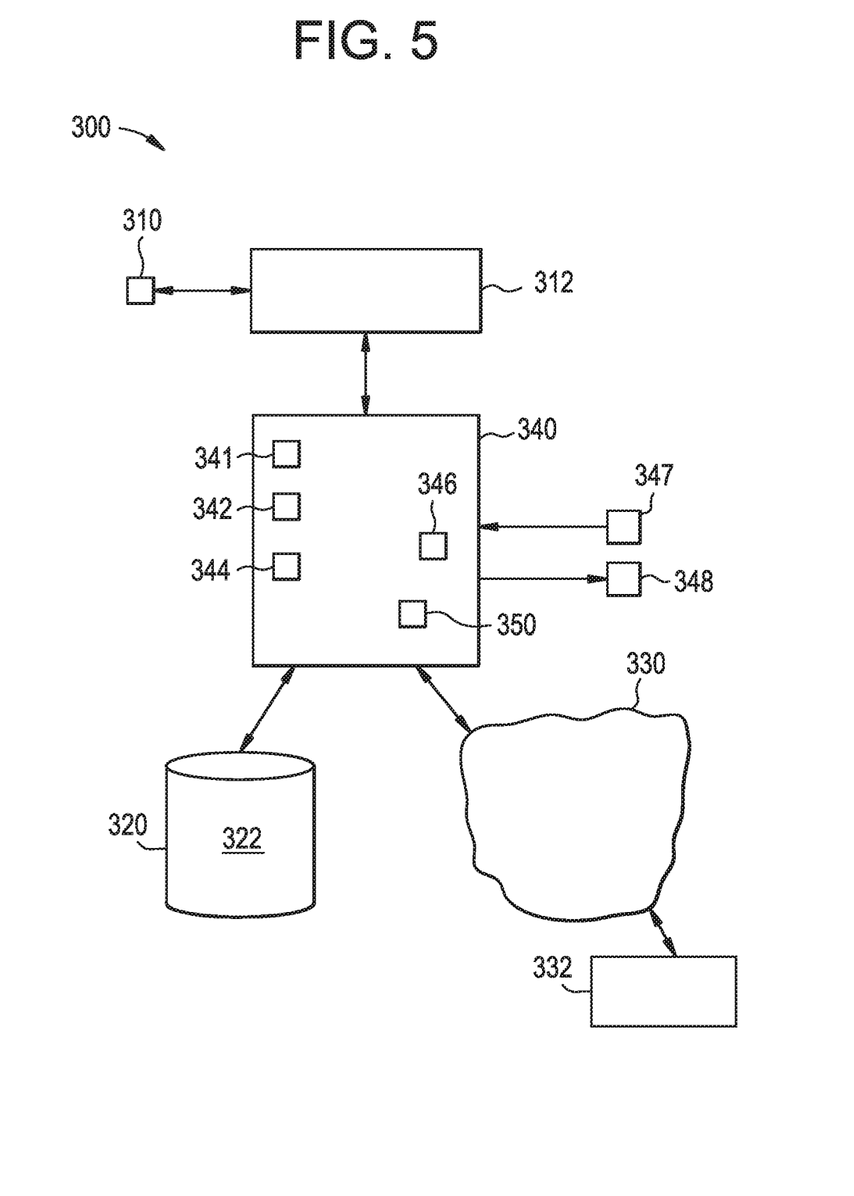
FIG. 5 is a block diagram of another embodiment of an RFID Tracking System in accordance with the present invention.

As shown in FIG. 5, one embodiment of an RFID Tracking System 300 of the present invention includes an RFID Reader 312 in communication with a computing device server 340. RFID Reader 312 is configured to receive signals from an RFID tag 310 and to transmit signals to the RFID tag 310. The RFID reader 312 collects and processes data received from the RFID tag 310 and subsequently transfers the processed data in a useable format (e.g., SQL, Excel, pdf) to the computing device server 340 having appropriate middleware installed and running thereon. Through the use of such middleware, the server 340 processes and transfers the data in a useable format (e.g., SQL, Excel, pdf) and thereby populates a master database 320 with data 322. Alternatively, such data is exported to an external interface 332 via a communications network 330. The external interface 332 includes an end-user's asset management database wherein such transmitted data is compatible with such end-user's asset management server operating system. In one embodiment, the end-user's asset management server operating system includes ERP software. In one such embodiment, the ERP software is the SAP® ERP Software System. Software executing on the server 340 retrieves, displays and updates the data. The system 300 further includes software executing on the server 340 for receiving a request from an End User for at least a portion of the data 322. Software executing on the server retrieves data 322 from the database 320 in response to the request. Software executing on the server transmits the retrieved data in accordance with the request.

As further shown in FIG. 5, an exemplary embodiment of system 300 is configured to securely generate, receive, store, catalog, update, provide relatively easy access to and/or transmit data 322 between and among End Users and other authorized users and/or administrators of the system in addition interface with external systems 332 for the purpose of exchanging data. The server 340 includes a central processing unit (CPU) 341, memory 342 that can include random access memory (RAM), read only memory (ROM), one or more data storage devices 344 such as a hard drive (HD) and the like, an input/output controller (I/O CNTRL) 346 operatively coupled to input and output devices 347 and 348, such as a keyboard, mouse, light pen or other pointing device, a document, card or other medium reader or scanner, a printer, a monitor or other display device for facilitating input to and output from the system of data and information, and an electronic communication apparatus (COMMS) 350 for communicating, with the network 330 such as, for example, the Internet, an intranet, an extranet, or like distributed communication platform connecting computing devices over wired and/or wireless connections. In one embodiment, system 300 is configured to interface with an inventory management system for inventory control and real time financial reporting.

It should be appreciated that the term server generally refers to one or more computing devices for use with the present invention. The server may comprise, for example, a standalone computing device and/or two or more computing devices operatively connected and functioning together to perform computer implemented functions as described herein.

The RFID tag 10 is permanently molded into the connector, housing, shroud, etc., to insure long-term uninterrupted use. Molding the RFID tag 10 within the electrical asset component insures the RFID tag 10 is not removed or damaged during use in rugged environments. Maintaining data within or in conjunction with the RFID tag 10 provides an ability to track electrical assets as they are passed from owner to owner or from lessee to lessee as well as the ability to reliably track such data for the longer periods required by LED products. Maintaining data within or in conjunction with the RFID tag 10 provides the ability to track circuit locations on airfields which can be challenging over time due to multiple modifications and resource turnover. All data collected over time for all applications described above can be used to determine usage, follow trends, and build location data of the respective electrical asset. Moreover, maintaining data within or in conjunction with the RFID tag 10 provides the ability to store data for multiple users such as for example from the manufacturer, to the lessee, to the lessor, to the end user. Each field of data stored within the RFID tag 10 can be locked per user and protected over time.

Each RFID tag 10 molded into an electrical asset, connector or other housing is rugged and made to endure the conditions of the rugged environments in which are intended to operate and as described above. In addition, the operating temperature ranges of certain electrical assets having the RFID tag 10 disposed therein exceed temperatures required for the molding process. The RFID tag 10 requires no internal power support; such RFID tags 10 are powered by the reader or scanner of the RFID tag 10. The expected life cycle or tag lifetime of each RFID tag 10 is greater than fifty (50) years including handling in excess of 100,000 read/write transmissions or transactions. In one embodiment, the RFID tag 10 comprises an ultra high frequency tag.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A Radio Frequency Identification ("RFID") tracking system for electrical power distribution assets, the system comprising:
   a plurality of electrical assets;
   at least one attachable identifier for tracking one or more of the plurality of electrical assets, the at least one attachable identifier defining an external surface and at least one radially extending portion or axially extending portion thereof;
   an RFID transponder molded into the at least one radially extending portion or axially extending portion and below the exterior surface of the at least one attachable identifier, the RFID transponder configured to transmit a first signal to a transmitting and receiving device and receive a second signal from the transmitting and receiving device;
   a portable adaptive reader having a processor and customizable interface enabled with an application configured for transmitting and receiving data to and from the RFID transponder; and
   a computing device having a server with middleware installed and running thereon and thereby receiving data from the reader, populating an exportable master database, and transferring the data in a useable format from the exportable master database to an external interface.

2. The RFID tracking system of claim 1, wherein the useable format is one of SQL, Excel and Portable Data Format ("pdf").

3. The RFID tracking system of claim 2, wherein the external interface is an end-user's asset management database and the data transmitted thereto is compatible with the end-user's asset management server operating system.

4. The RFID tracking system of claim 3, wherein the end-user's asset management server operating system includes enterprise resource planning ("ERP") software.

5. The RFID tracking system of claim 1, wherein the at least one of the plurality of electrical assets is one of a power connector, a mountable connector, a power outlet, a power plug, a power cord grip, a junction box, an outlet box, a lighting streamer, a molding socket, a permanently molded male connector and a permanently molded female connector.

6. The RFID tracking system of claim 1, wherein the at least one attachable identifier is a shroud.

* * * * *